UNITED STATES PATENT OFFICE.

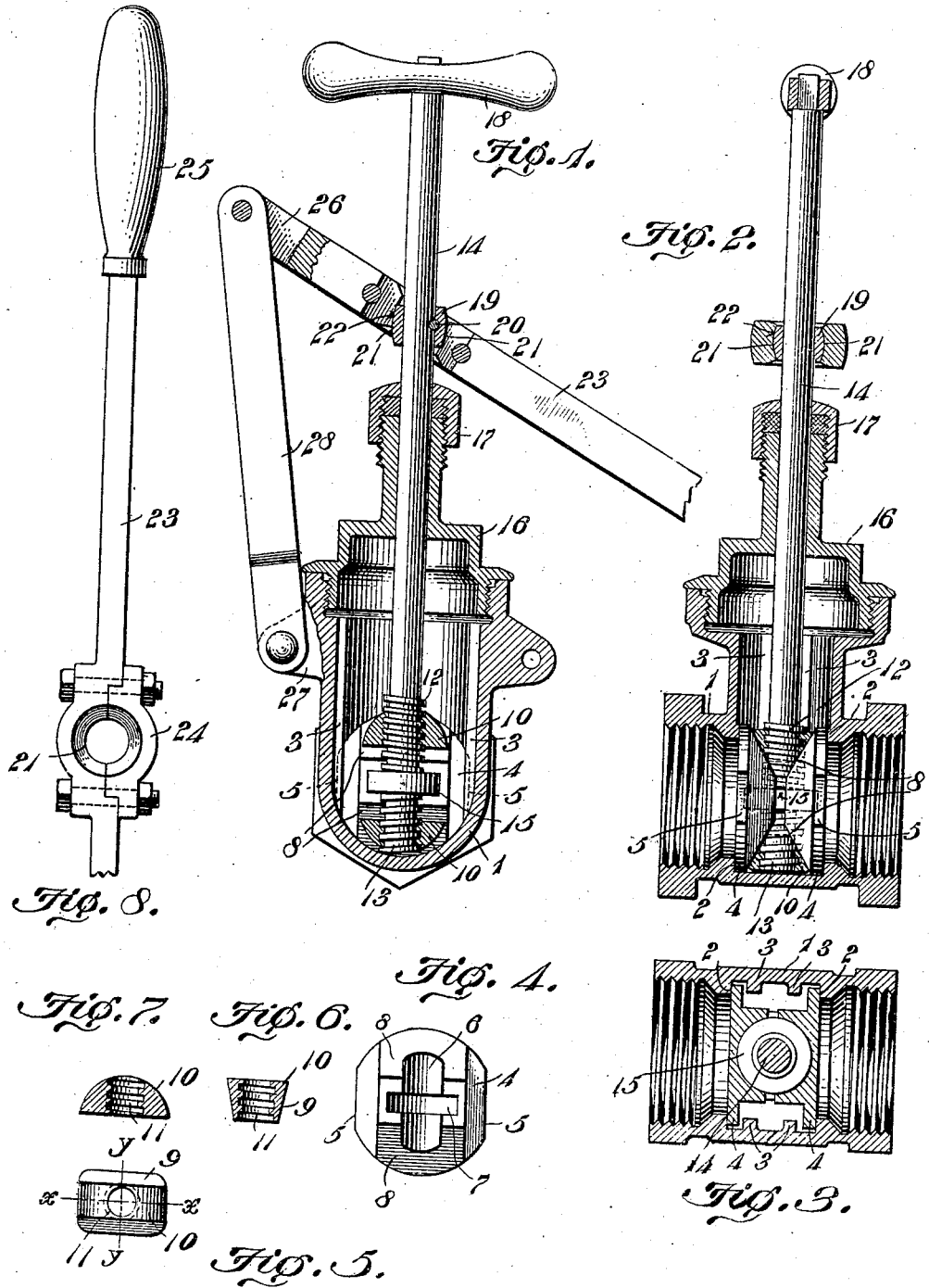

JOHN P. LADD, OF DETROIT, MICHIGAN.

GATE-VALVE.

No. 880,674.     Specification of Letters Patent.     Patented March 3, 1908.

Application filed April 2, 1906. Serial No. 309,399.

*To all whom it may concern:*

Be it known that I, JOHN P. LADD, a citizen of the United States, residing at Detroit, in the county of Wayne and State of Michigan, have invented a new and useful Gate-Valve, of which the following is a specification.

This invention relates to gate valves and its object is to provide a device of this character which can be quickly opened or closed and which is formed with means whereby the gates can be clamped firmly upon the seats.

With the above and other objects in view the invention consists of a casing having a stem rotatably mounted therein and provided with an integral collar which projects into engagement with oppositely disposed gates mounted in suitable guides within the casing. The stem is oppositely threaded at opposite sides of the collar and these threads engage spreading blocks which bear upon beveled faces of the gates and are adapted when the stem is rotated to simultaneously move from or toward each other so as to shift the gates toward their seats or release them from contact therewith. The rotatable stem is adapted to be raised and lowered by an actuating lever after the gates have been loosened.

The invention also consists of certain other novel features of construction and combinations of parts which will be hereinafter more fully described and pointed out in the claims.

In the accompanying drawings is shown the preferred form of the invention.

In said drawings: Figure 1 is a vertical transverse section through the valve and its operating mechanism; Fig. 2 is a vertical longitudinal section therethrough; Fig. 3 is a horizontal section through the casing; Fig. 4 is a rear elevation of one of the gates; Fig. 5 is a top plan view of one of the spreading blocks; Fig. 6 is a section on line $y-y$ Fig. 5; Fig. 7 is a section on line $x-x$ Fig. 5; and Fig. 8 is a top view of a portion of the operating lever.

Referring to the figures by numerals of reference, 1 is a valve casing having oppositely disposed valve seats 2 between which are interposed guide ribs 3 located at the sides of the casing and disposed parallel with the seats. Mounted between each seat and its adjacent ribs is a gate in the form of a disk 4 the opposite portions of which are flattened as shown at 5 to fit against the straight side walls of the casing and the outer faces of these disks are finished so as to fit snugly against the seats while their inner faces have grooves 6 therein and extending longitudinally along the center of said faces. Each of these grooves is provided at the center with a transversely extending recess 7 disposed at right angles to the groove 6 and having its inner wall formed in the arc of a circle. The upper and lower portions of the inner faces of the gates are beveled as shown at 8 and are adapted to be contacted by correspondingly beveled faces 9 of oppositely disposed spreading blocks 10. These blocks are interposed between the upper and lower beveled portions of the gates and have screw threaded passages 11 extending therethrough and engaging oppositely pitched threads 12 and 13 formed on a rotatable stem 14. The threaded portion of the stem rests within the grooves 6 of the jaws but does not engage them and interposed between the two threads 12 and 13 is a collar 15 preferably integral with the stem and projecting into and rotatable within the recesses 7.

The stem 14 is slidably mounted in a hood 16 detachably secured on the upper end of the casing 1 and having a stuffing box 17 which forms a tight joint around the stem and prevents leakage. The upper end of the stem has a hand-hold 18 fastened to it whereby the stem can be readily rotated and a ring 19 is fastened to the stem at a point between the stuffing box and the hand-hold, said ring being preferably secured by means of a key 20 engaging it and the stem. The ends of the ring are rounded as shown at 21 and said ring is movably supported within a socket 22 formed in a lever 23, said ring being held in the socket by means of a cap 24. One end of the lever has a handle 25 while its other end is forked as at 26 and is connected to an ear 27 on the casing 1 by means of a link 28. When it is desired to close the valve herein described the lever 23 is pushed toward the casing so as to cause the stem 14 to slide longitudinally. As the collar 15 engages the gates they will be moved into position between the seats 2. When the limit of this longitudinal movement has been reached the stem 14 is rotated so as to cause the spreading blocks 10 to move toward each other and against the beveled faces of the gates. Said gates will therefore be spread apart and clamped against the seats 2 so as to close the valve. To release the gates the stem is rotated in the opposite direction until the blocks are removed from contact with the beveled faces of the gates. The pressure of said gates upon the seats is thus removed and the gates can be raised by pulling upward on the lever 23. A valve such as herein described can be quickly opened or closed and by reason of its peculiar construction is particularly adapted for use in high pressure pipes. The distance between each seat and the adjacent rib 3 is of course sufficient to allow the gate to move toward and away from its seat when acted upon by the spreading blocks.

What is claimed is:

A gate valve comprising a casing having oppositely disposed seats, gates slidably mounted within the casing and spaced apart, the adjoining faces of said gates being oppositely beveled, a stem revolubly mounted within the casing and projecting between the gates, said stem having an integral collar upon that portion thereof between the gates, said collar extending loosely within recesses in the gates and disposed to hold the gates and stem against independent longitudinal movement, said stem being provided with oppositely pitched threads adjacent opposite faces of the collar, and tapered spreading devices engaged by said threads and interposed between the beveled faces of the gates, said stem being disposed to be rotated to move the spreading devices toward or from each other to permit outward or inward movement of the gates without necessitating longitudinal movement of the stem and gates.

In testimony that I claim the foregoing as my own, I have hereto affixed my signature in the presence of two witnesses.

JOHN P. LADD.

Witnesses:
   WM. J. CHESNUT,
   J. JACOB.